United States Patent
Nakamura et al.

(10) Patent No.: US 8,150,217 B2
(45) Date of Patent: Apr. 3, 2012

(54) IMAGE PROCESSING APPARATUS, METHOD AND PROGRAM

(75) Inventors: Satoshi Nakamura, Miyagi (JP); Mikio Watanabe, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1023 days.

(21) Appl. No.: 12/103,495

(22) Filed: Apr. 15, 2008

(65) Prior Publication Data

US 2008/0253683 A1    Oct. 16, 2008

(30) Foreign Application Priority Data

Apr. 16, 2007  (JP) ................................ 2007-107326

(51) Int. Cl.
*G06K 9/03* (2006.01)
(52) U.S. Cl. ...................................................... 382/309
(58) Field of Classification Search .................. 382/309, 382/305.154; 358/537, 452; 345/419, 619; 348/42, 207.99; 386/52
See application file for complete search history.

(56) References Cited

U.S. PATENT DOCUMENTS

| | | | | |
|---|---|---|---|---|
| 6,496,598 B1 * | 12/2002 | Harman | ...................... | 382/154 |
| 6,834,130 B1 * | 12/2004 | Niikawa et al. | ............... | 382/305 |
| 7,783,136 B2 * | 8/2010 | Hayashi | ........................ | 382/305 |
| 2002/0001036 A1 | 1/2002 | Kinjo | | |
| 2005/0063668 A1 * | 3/2005 | Hosoi et al. | ..................... | 386/52 |
| 2006/0170704 A1 * | 8/2006 | Kotani et al. | .................. | 345/619 |
| 2009/0040315 A1 * | 2/2009 | Nakase et al. | ........... | 348/207.99 |
| 2010/0315517 A1 * | 12/2010 | Nakamura et al. | ....... | 348/207.99 |

FOREIGN PATENT DOCUMENTS

| | | |
|---|---|---|
| JP | 2001-333327 A | 11/2001 |
| JP | 2004-102513 A | 4/2004 |
| JP | 2006-262202 A | 9/2006 |

* cited by examiner

*Primary Examiner* — Ishrat I Sherali
(74) *Attorney, Agent, or Firm* — Birch, Stewart, Kolasch & Birch, LLP (57) ABSTRACT

An image processing apparatus, comprising:
a master image acquisition part for acquiring a master image that is the multiple viewpoint image data taken from two or more viewpoints;
a recording part capable of recording the image data;
a recording control part for recording the master image acquired by the master image acquisition part in the recording part; and
an edit part for editing the master image recorded in the recording part according to a desired edit content;
wherein the recording control part records an edited image that is the image edited by the edit part distinguishably from the master image in the recording part, and records the edit history information indicating the edit content made by the edit part associated with the master image in the recording part.

11 Claims, 8 Drawing Sheets

IMAGE PROCESSING APPARATUS, METHOD AND PROGRAM

BACKGROUND OF THE INVENTION

1. Field of the Invention

The present invention relates to the reuse of an edited multiple viewpoint image.

2. Description of the Related Art

According to Japanese Patent Application Laid-Open No. 2004-102513, an image for stereoscopic vision is generated by correcting an acquired parallax image for brightness, color difference and upper or lower position.

According to Japanese Patent Application Laid-Open No. 2006-262202, the corrected history information of an image is recorded as additional information in a corrected image file.

In producing a print or display output for stereoscopic vision from the image taken from plural viewpoints (multiple viewpoints) as in Japanese Patent Application Laid-Open No. 2004-102513, it is common to make correction and conversion for the image optimal to an output system without directly outputting the taken image.

In this conversion to the output system, it is required to make optimizations for not only the kind or type of apparatus in the output system, but also various conditions including the size of screen, appreciation distance and range (horizontal angle).

The processing content of how an original parallax image is corrected to generate an image for stereoscopic vision is not known afterwards in Japanese Patent Application Laid-Open No. 2004-102513.

It is difficult to reuse the results of correction made in the past, because the location of a file generated as a result of correction or what correction is made in the corrected file is not known in an original image file before correction in Japanese Patent Application Laid-Open No. 2006-262202.

SUMMARY OF THE INVENTION

Thus, it is an object of the invention to reuse the processing content according to an output system for the multiple viewpoint image.

According to the present invention, there is provided an image processing apparatus comprising a master image acquisition part for acquiring a master image that is multiple viewpoint image data taken from two or more viewpoints, a recording part capable of recording the image data, a recording control part for recording the master image acquired by the master image acquisition part in the recording part, and an edit part for editing the master image recorded in the recording part according to a desired edit content, wherein the recording control part records an edited image that is the image edited by the edit part distinguishably from the master image in the recording part, and records the edit history information indicating the edit content made by the edit part associated with the master image in the recording part.

With this invention, the reuse of the edit result in the past can be facilitated. Also, when the master image is subjected to the edit operation, the master image can be reliably saved.

The edit history information may include at least one of the identification information of the edited image, the edit date and time of the edited image, the type of an output system of the edited image, the appreciation environment of the output system of the edited image and the other output conditions, a trimming range where the edited content is trimming, positional information of a set gaze point where the edit content is setting of the gaze point, information indicating a selected viewpoint image where the edit content is selection of the viewpoint image, and correction information where the edit content is image quality correction.

When the edit content in the past is reused based on these information, the image selection of the edited image adequately edited can be facilitated.

The recording control part records the edited image associated with the identification information of the master image in the recording part.

In this manner, it is possible to refer to the master image that is the multiple viewpoint image of edit source from the edited image.

The recording control part may reserve an area for storing the edit history information in an image file for storing the master image, and after the end of editing by the edit part, may store the edit history information in the area to associate the master image with the edit history information.

In this manner, it is possible to prevent the size of the file storing the master image from being changed every time of storing the edit history information.

According to the invention, there is provided an image processing apparatus comprising a recording part for recording an edited image in which a master image is edited distinguishably from the master image and recording the edit history information indicating the edit content of the master image and the identification information of the edited image associated with the master image, a retrieval part for retrieving the edit history information corresponding to a desired edit content for the master image from the recording part, and an edited image acquisition part for acquiring the edited image from the recording part based on the identification information of the edited image included in the found edit history information, if the retrieval part finds the edit history information indicating the desired edit content.

With this invention, the edited image in the past can be reused, whereby it is unnecessary to reedit the same master image in the same manner as before.

It is preferable to further comprise an edit part for editing the master image recorded in the recording part in accordance with the desired edit content, if the retrieval part does not find the edit history information corresponding to the desired edit content, and a recording control part for recording the edited image that is the image edited by the edit part distinguishably from the master image in the recording part and recording the edit history information indicating the edit content made by the edit part associated with the master image in the recording part.

According to the invention, there is provided an image processing apparatus comprising a master image acquisition part for acquiring a master image that is the multiple viewpoint image data taken from two or more viewpoints, a recording part capable of recording the image data, a recording control part for recording the master image acquired by the master image acquisition part in the recording part, and an edit part for editing the master image recorded in the recording part according to a desired edit content, wherein the recording control part records an edited image that is the image edited by the edit part distinguishably from the master image in the recording part, and records the edit history information indicating the edit content made by the edit part and the identification information of the edited image associated with the master image in the recording part, and comprises a retrieval part for retrieving the edit history information corresponding to the desired edit content for the master image from the recording part, and an edited image acquisition part for acquiring the edited image from the recording part based on the identification information of the edited image included in the found edit history information, if the retrieval part finds the edit history information indicating the desired edit content.

According to the invention, there is provided an image processing method comprising the steps of: a step of acquiring a master image that is the multiple viewpoint image data taken from two or more viewpoints, a step of recording the acquired master image in a recording medium, a step of editing the master image recorded in the recording medium according to a desired edit content, and a step of recording an edited image distinguishably from the master image in the recording medium, and recording the edit history information indicating the edit content associated with the master image in the recording medium.

According to the invention, there is provided an image processing method comprising the steps of: a step of recording an edited image in which a master image is edited distinguishably from the master image in a recording medium, and recording the edit history information indicating the edit content of the master image and the identification information of the edited image associated with the master image in the recording medium, a step of retrieving the edit history information corresponding to a desired edit content for the master image from the recording medium, and a step of acquiring the edited image from the recording medium based on the identification information of the edited image included in the found edit history information, if the edit history information indicating the desired edit content is found.

A program for enabling a computer to perform the image edit method may be also included in the invention.

With the invention, since the edit history information indicating in which file the edited image is recorded as a result of correction and conversion is created, it is unnecessary to make the correction and conversion again when the correction and conversion with actual result in the past is required, whereby the reuse of the file produced as a result of conversion in the past is facilitated.

DETAILED DESCRIPTION OF THE PREFERRED EMBODIMENTS

Figure 1:
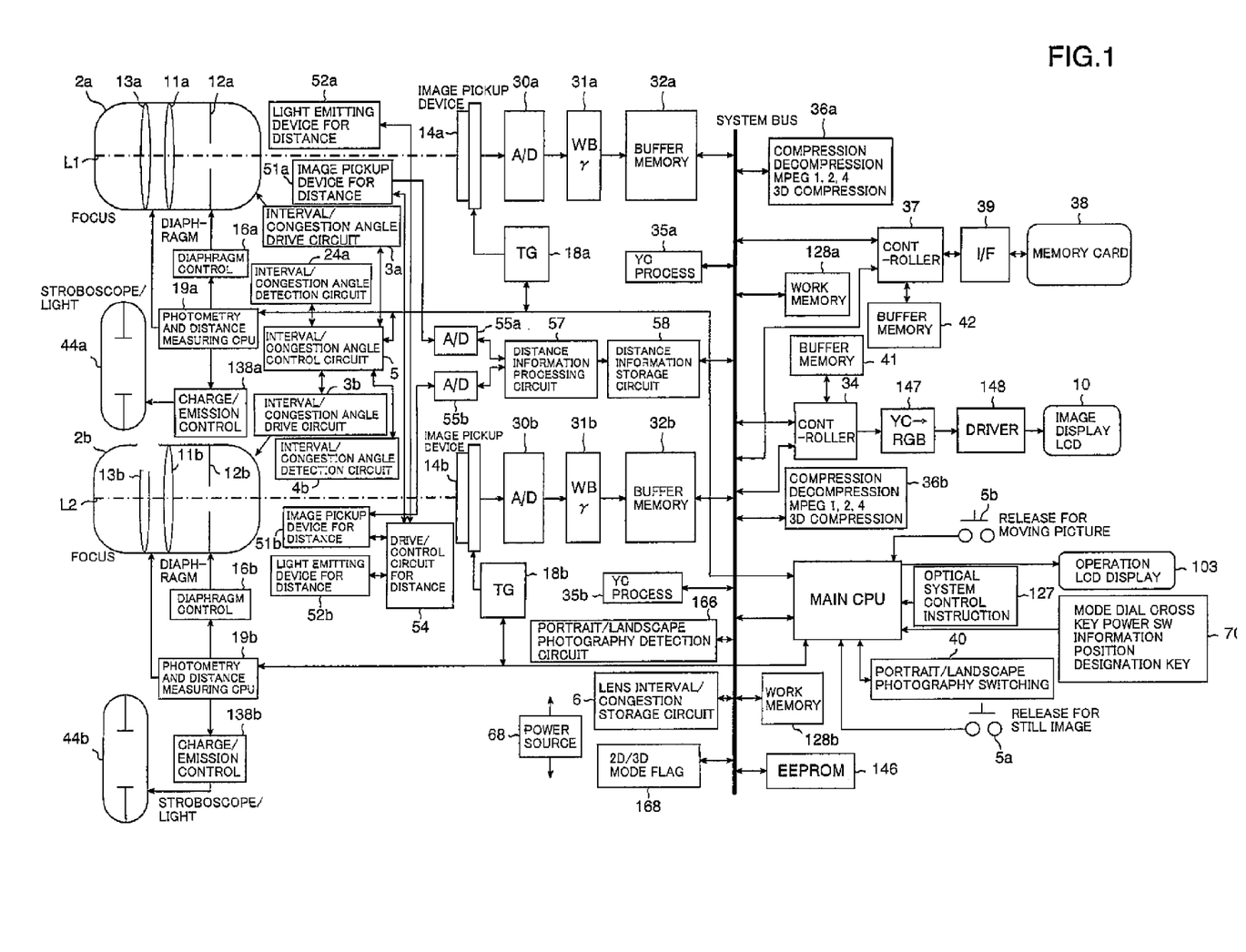
FIG. 1 is a block diagram of a camera.

FIG. 1 shows an electrical configuration of a compound-lens camera 1. The lens optical axes L1 and L2 of the first and second image pickup parts 2a and 2b are juxtaposed to be parallel or make a predetermined angle.

The first image pickup part 2a comprises a first zoom lens 11a, a first diaphragm 12a, a first focus lens 13a, and a first image sensor 14a, which are arranged along the lens optical axis L1. The first diaphragm 12a is connected to a diaphragm control part 16a, and the first image sensor 14a is connected to a timing generator (TG) 18a. The operation of the first diaphragm 12a and the first focus lens 13a is controlled by a photometry and distance measuring CPU 19a. The operation of the TG 18a is controlled by a main CPU 62.

The camera 1 is provided with an operation part 70 for performing various operations when the user employs this camera 1. This operation part 70 has a power switch for turning on the power for activating the camera 1, a mode dial for selecting the automatic photographing or the manual photographing, a cross key for making the setting or selection of various kinds of menu or making the zoom, a switch for firing the flash, and an information position designation key for executing or canceling the menu selected by the cross key. Turning on or off the power, switching of various kinds of modes (photographing mode, reproduction mode, etc.) and zooming can be made by performing a proper operation on the operation part 70.

Also, the camera 1 comprises a main CPU 62, an EEPROM 146, a YC/RGB conversion part 147, and a display driver 148. The main CPU 62 controls the overall camera 1. The EEPROM 146 stores the solid data and program inherent to the camera 1.

The YC/RGB conversion part 147 converts the color video signals YC generated by the YC processing parts 35a and 35b into the RGB signals of three colors and outputs them via the display driver 148 to an image display LCD 10.

In accordance with a zoom operation from an input operation part 9, the first zoom lens 11a is moved along the lens optical axis L1 to the NEAR side (extension side) or the INF side (contraction side) to change the zoom magnification. This movement is driven by a motor, not shown. The diaphragm 12a is changed in the numerical aperture (aperture value) to limit the light flux for exposure adjustment when an AE (Auto Exposure) is operative. The focus lens 13a is moved to the NEAR side or the INF side along the lens optical axis L1 to change the in-focus position for focusing adjustment when an AF (Auto Focus) is operative. This movement is driven by a motor, not shown.

When a halfway pressed state of a still image release switch is detected, the main CPU 62 obtains the distance measured data from each of the distance image pickup devices 51a and 51b. The main CPU 62 adjusts the focusing and diaphragm, based on the obtained distance measured data.

The first image sensor 14a receives a light of the subject formed by the first zoom lens 11a, the first diaphragm 12a and the first focus lens 13a, and accumulates photoelectric charges according to the amount of received light in a photoreceptor. The operation of the first image sensor 14a to accumulate and transfer photoelectric charges is controlled by the TG 18a so that an electronic shutter speed (photoelectric charge accumulation time) is decided by a timing signal (clock pulse) inputted from the TG 18a. The first image sensor 14a acquires an image signal for one screen at every predetermined interval in a photographing mode.

The second image pickup part 2b has the same constitution as the first image pickup part 2a, and comprises a second zoom lens 11b, a second diaphragm 12b, a second focus lens 13b and a second image sensor 14b connected to the timing generator (TG) 14b. Their operation is controlled by the main CPU 62. The first image pickup part 2a and the second image pickup part 2b are fundamentally operated in cooperation, but may be operated individually. The first and second image sensors 14a and 14b are the CCD type or CMOS type image sensors.

An image pickup signal outputted from the first and second image sensors 14a and 14b is inputted into the A/D converters 30a and 30b. Each of the A/D converters 30a and 30b converts the inputted image data from analog to digital form. Through the A/D converters 30a and 30b, the image pickup signal of the first image sensor 14a is outputted as the first image data (right eye image data) and the image pickup signal of the second image sensor 14b is outputted as the second image data (left eye image data).

The image signal processing circuits 31a and 31b perform various kinds of image processings, including gradation conversion, white balance correction and γ correction for the first and second image data inputted from the A/D converters 30a and 30b. Buffers memories 32a and 32b temporarily store the first and second image data that are subjected to various kinds of image processings by the image signal processing circuits 31a and 31b.

The photometry and distance measuring CPUs 19a and 19b calculate an AF evaluation value and an AE evaluation value from the first and second image data stored in the buffer memories 32a and 32b, respectively. The AF evaluation value is calculated by integrating the high frequency components of the brightness value over the entire area or in a predetermined area (e.g., central part) of each image data and indicates the sharpness of image. The high frequency component of the brightness value is a summation of adding up the brightness differences (contrast) between adjacent pixels in the predetermined area. Also, the AE evaluation value is calculated by integrating the brightness values over the entire area or in a predetermined area (e.g., central part) of each image data and indicates the lightness of image. The AF evaluation value and the AE evaluation value are used in the AF operation and the AE operation that are performed in a photographing preparation process as will be described later.

The image data stored in the buffer memories 32a and 32b are converted into a brightness signal (Y signal) and the color difference signals (Cr, Cb signals) by the YC processing parts 35a and 35b, and subjected to a predetermined process such as gamma correction. The processed YC signals are stored in work memories 128a and 128b, respectively.

The YC signals of the first and second image data stored in the work memories 128a and 128b are read into a YC/RGB conversion parts 147 by a controller 34. The YC/RGB conversion part 147 converts the YC signals of the first and second image data into a video signal of predetermined type (e.g., color composite video signal of NTSC type) and synthesizes it into stereoscopic 3D image data for stereoscopic display on the image display LCD 10. When the LCD 10 is used as an electronic viewfinder in a photographing mode, the stereoscopic 3D image data synthesized by the YC/RGB conversion part 147 is displayed as a through image via the LCD driver 148 on the LCD 10.

The compression decompression processing circuits 36a and 36b perform the compression process for the first and second image data stored in the work memories 128a and 128b in accordance with a predetermined compression format such as JPEG for the still image and MPEG2, MPEG4 or H.264 for the moving picture. A media controller 37 records each image data compressed by the compression decompression processing circuits 36a and 36b in a memory card 38 or any other recording media connected via an I/F 39.

When the first and second image data recorded in the memory card 38 in this manner is reproduced and displayed on the LCD 10, each image data of the memory card 38 is read by the media controller 37, decompressed by the compression decompression processing circuits 36a and 36b, converted into stereoscopic 3D image data by the YC/RGB conversion part 147, and displayed as the reproduced image on the LCD 10 via the LCD driver 148.

The LCD 10 is a 3D monitor of parallax barrier type or lenticular lens type, used as an electronic viewfinder in taking photographs, and displays the stereoscopic 3D view for image data obtained by photographing in regenerating the image.

Though the detailed structure of the LCD 10 is not illustrated, the LCD 10 has a parallax barrier display layer on the surface. In making the stereoscopic 3D display, the LCD 10 generates a parallax barrier composed of a pattern in which a light transmitting part and a light shielding part are alternately arranged at a predetermined pitch on the parallax barrier display layer and alternately displays an array of image pieces like strips representing the left and right images on an image display plane of its lower layer, thereby allowing a stereoscopic vision.

The constitution of the display device for allowing the stereoscopic vision is not necessarily limited to a parallax method using a slit array sheet, but may be a lenticular method using a lenticular lens sheet, an integral photography method using a micro-lens array sheet or a holographic method using an interference phenomenon.

The main CPU 62 generally controls the overall operation of the compound-lens camera 1. The release switches 5a and 5b, the operation part 70 and an EEPROM 146 that is a non-volatile memory are connected to the main CPU 62. The EEPROM 146 stores various kinds of control programs and the setting information. The main CPU 62 performs various kinds of process based on this program and the setting information.

Also, an optical system control directing part 127 is connected to the main CPU 62, whereby the photographing magnifications of the first image pickup part 2a and the second image pickup part 2b are changed in accordance with a zoom operation on the optical system control directing part 127.

The release switch 5a has a switch structure of two stage press. If the release switch 5a is lightly pressed (halfway down) in the photographing mode, the AF operation and the AE operation are performed, whereby a photographing preparation process is made. If the release switch 5a is further strongly pressed (all the way down) in this state, a photographing process is performed, so that the first and second image data for one screen are transferred from the frame memories 32 to the memory card 38 and recorded.

The AF operation is performed by calculating the maximum value of the AF evaluation values calculated from the first and second image data sequentially obtained, while the main CPU 62 controls the first and second focus lenses 13a and 13b to be moved in the predetermined direction. The AE operation is performed by setting the aperture values of the first and second diaphragms 12a and 12b and the electronic shutter speeds of the first and second image sensors 14a and 14b, based on the calculated AE evaluation value after completion of the AF operation.

Also, the camera 1 is provided with an operation LCD display 103 for assisting the operation.

Also, the camera 1 has a removable power battery 68. The power battery 68 may be a chargeable secondary battery, for example, a Ni—Cd battery, a nickel hydrogen battery, or a lithium ion battery. The power battery 68 is a disposable primary battery, for example, a lithium battery or an alkaline battery. The power battery 68 is loaded into a battery storage compartment, not shown, which is then electrically connected to each circuit of the camera 1.

The first image pickup part 2a and the second image pickup part 2b comprise the interval/congestion angle detection circuits 4a and 4b for detecting the interval/congestion angle made between the first image pickup part 2a and the second image pickup part 2b, a lens interval/congestion angle storage circuit 6 for storing the congestion angle detected by the interval/congestion angle detection circuits 4a and 4b, and the interval/congestion angle drive circuits 3a and 3b for changing the congestion by elongating or shrinking the base length and rotating the optical axis by the drive motor.

Also, the camera 1 comprises an interval/congestion angle control circuit 5 for controlling a change of the congestion angle in the interval/congestion angle drive circuit 3a and 3b, based on the interval/congestion angle detected by the interval/congestion angle detection circuits 4a and 4b.

The charge/emission control parts 138a and 138b are supplied with power from the power battery 68 to make the stroboscopes 44a and 44b flash, and charge the condensers for firing the flash, not shown, and control the stroboscopes 44a and 44b to fire the flash.

The charge/emission control parts 138a and 138b controls the supply of current to the stroboscopes 44a and 44b to acquire a desired amount of emission at a desired timing, if various kinds of signal such as an operation signal for pressing the release switches 5a and 5b halfway down or all the way down, or a signal indicating the amount of emission or the emission timing is taken from the main CPU 62 or the photometry and distance measuring CPUs 19a and 19b.

A portrait/landscape photography switching button 40 directs in which of the portrait and landscape photography the photographing is performed. A portrait/landscape photography detection circuit 166 detects in which of the portrait and landscape photography the photographing is performed, depending on a state of this button.

A 2D/3D mode switching flag 168 is set to indicate a 2D mode or a 3D mode.

The distance light emitting devices 52a and 52b are light emitting diodes (LEDs) for applying a projection spot to the same subject captured by the first image pickup part 2a and the second image pickup part 2b, respectively.

The distance image pickup devices 51a and 51b are the image pickup devices dedicated for measuring the distance to acquire the subject image to which a projection spot is applied from the distance light emitting devices 52a and 52b.

A distance drive/control circuit 54 controls synchronization of the distance image pickup devices 53a and 53b with the light emitting timing of the distance light emitting devices 52a and 52b.

An analog image signal obtained through the image pickup operation of the distance image pickup devices 53a and 53b is converted into digital image data by the distance measuring A/D converters 55a and 55b and outputted to a distance information processing circuit 57.

The distance information processing circuit 57 calculates the distance to the subject captured by the first image pickup part 2a and the second image pickup part 2b from the inputted digital image data. This is based on a so-called triangulation principle. The distance information calculated by the distance information processing circuit 57 is stored in a distance information storage circuit 58.

A multiple viewpoint image is not necessarily acquired by the compound-lens camera 1, but may be acquired through the continuous shooting by a motion stereo method using a single-lens camera.

Figure 2:
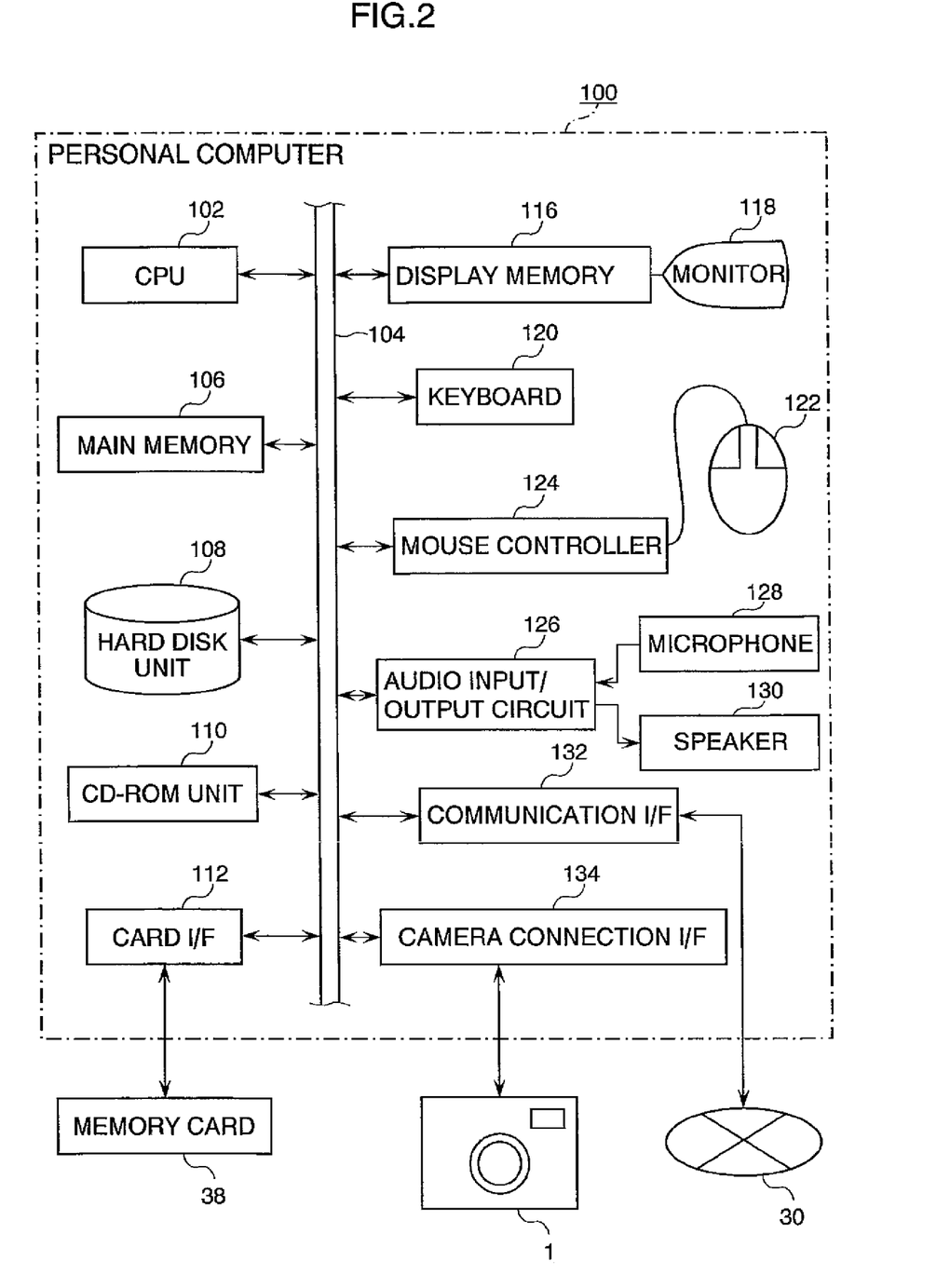
FIG. 2 is a block diagram of a personal computer.

FIG. 2 is a block diagram of a personal computer 100.

The personal computer 100 mainly comprises a central processing unit (CPU) 102 for controlling the operation of each component, a main memory 106 for storing a control program for the apparatus or useful as a working area in executing the program, a hard disk unit 108 for storing an operating system (OS) for the personal computer 100, a device driver for the peripheral apparatus connected to the personal computer 100, various kinds of application software including an image edit processing program for editing the multiple viewpoint image adaptable to various contents (video contents or printed matter) and the user image, a CD-ROM unit 110, a display memory 116 for temporarily storing the display data, a monitor unit 118 such as a CRT monitor or a liquid crystal monitor for displaying the image or character based on the image data or character data from the display memory 116, a keyboard 120, a mouse 122 as a position input unit, a mouse controller 124 for detecting a state of the mouse 122 to output a signal for the position of a mouse pointer on the monitor unit 118 or a state of the mouse 122 to the CPU 102, a communication interface 132 connected to a network 30 such as the Internet, a card interface 112 having a card insertion opening through which the memory card 38 is mounted or demounted, a bus 104 for connecting each component, and a camera connection I/F 134 for connecting the camera 1 with USB.

The application software for image edit processing stored in the hard disk unit 108 can be installed into the personal computer 100 by setting a CD-ROM recording the application software into the CD-ROM unit 110 for the personal computer 100.

The monitor unit 118, like the LCD 10, is configured to allow the multiple viewpoint image to be displayed in stereoscopic vision.

FIG. 3 shows a directory structure of image files storing the multiple viewpoint image data stored in the hard disk 108. For example, a file (master file) storing the unedited multiple viewpoint image data acquired from the camera 1 and a file (edited file) storing the edited multiple viewpoint image data obtained through the image edit process for the multiple viewpoint image data in the master file by the CPU 102 are given the different file names "ABCD0001.JPG" and "ABCD0001.F3D", as shown in FIG. 3A. The identification information "ABCD0001" in the file name of the edited file indicates that there is relevance between the master file and the edited file because the master file is also given the same identification information. An extension "JPG" or "F3D" is the information distinguishing between the master file and the edited file.

Figure 3A:
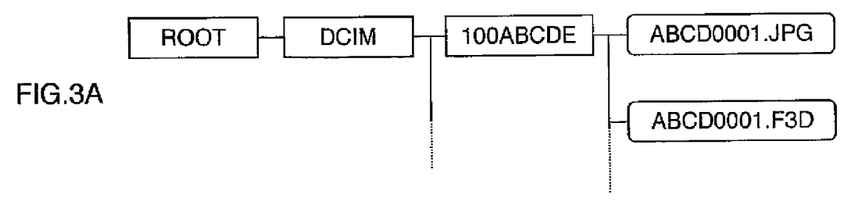
FIGS. 3A to 3E are diagrams showing the arrangement of a master file and the edited files on a hard disk.
Figure 3B:
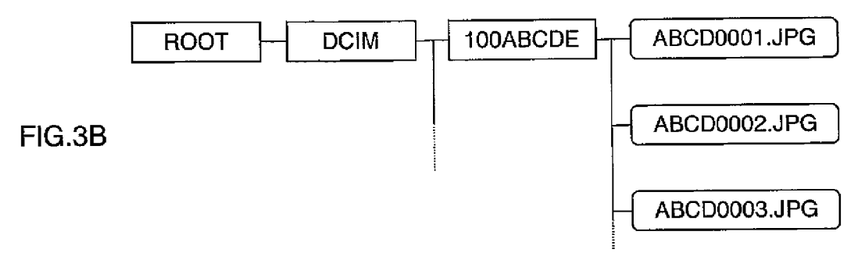

Or the master file and the edited file are given the different file names of "ABCD0001.JPG" and "ABCD0003.JPG", as shown in FIG. 3B. If the name of any existent image file is "ABCD0002.JPG", "ABCD0003.JPG" is given to the edited file not to overlap it. No information relating both files is contained in the names of both files.

Figure 3C:
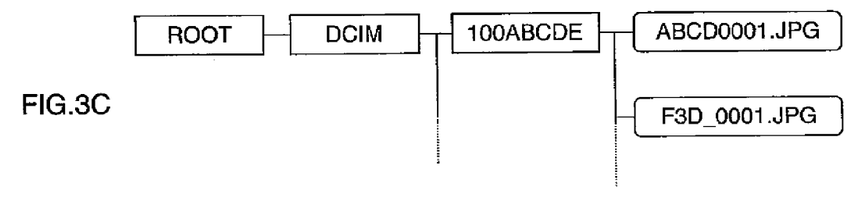

Or the master file and the edited file are given the different file names of "ABCD0001.JPG" and "F3D_0001.JPG", as shown in FIG. 3C. No information relating both files is contained in the names of both files.

Figure 3D:
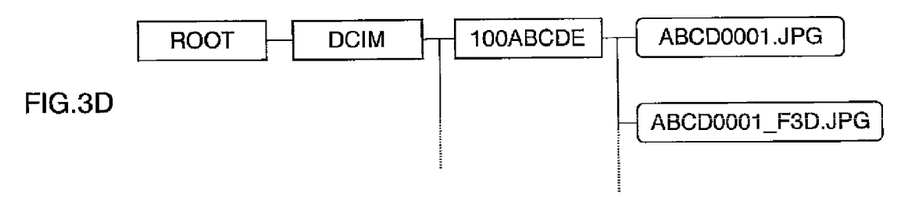

Or the master file and the edited file are given the different file names of "ABCD0001.JPG" and "ABCD0001_F3D.JPG", as shown in FIG. 3D. The file name of the edited data is a combination of the identification information "ABCD0001" indicating the relevance with the master file "ABCD0001.JPG" and "_F3D" indicating the edited file.

Figure 3E:
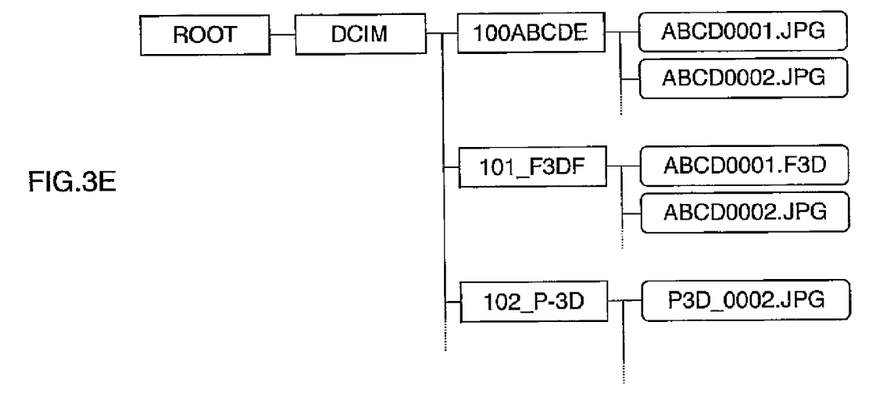

Or the edited file storing the edited data for 3D display is "ABCD0001.F3D" and the edited file storing the edited data for 3D print is given "P3D_0002.JPG" that is a different name from the master file according to the output system of the contents, as shown in FIG. 3E.

Such file name of the edited file is given by the CPU 102, based on the file name of the master file and one of the naming rules as shown in FIGS. 3A to 3E.

FIGS. 4 to 7 show the structure of the master file. A header of the master file includes one or more of the following pieces of information.

Figure 4:
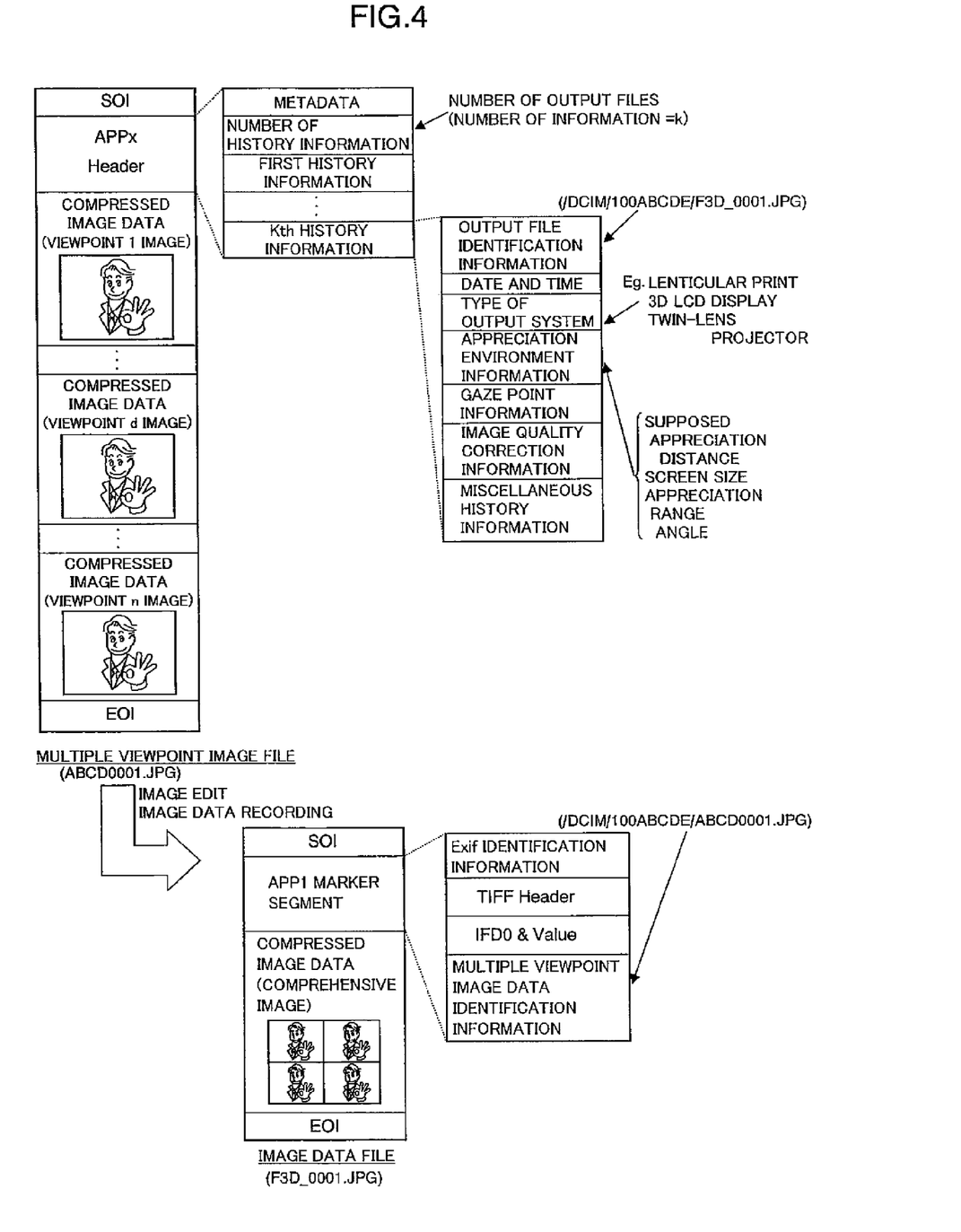
FIG. 4 is a diagram showing one example of the edit history information (such as output file identification information) stored in a header part of the mater file.

- Number of edited files edited and recorded so far based on the image of the master file
- Information for uniquely identifying the edited file
- Date and time information of generating and recording the edited file
- Type of output system to output the edited file, for example, appreciation distance, screen size or appreciation range angle
- Information indicating the trimming range, if the edit process for the image in the master file is trimming.
- Information of the gaze point set as the edit process for the image in the master file
- Information of the viewpoint image selected and used from the multiple viewpoint image in the edit process for the image of the master file, for example, viewpoint number and viewpoint position information
- Correction information when the image quality (brightness, color difference, etc.) is corrected in the edit process for the image in the master file Among others, the number k that the data is used and outputted so far as the edit source and the detailed information individually indicating the edit content in each of k times of edit are stored in the header part of the master file "ABCD0001.JPG" storing the multiple viewpoint image data of the edit source in FIG. 4.

The detailed information includes the file name (such as "F3D_0001.JPG") of the edited file, edit date and time, type of output system (e.g., lenticular print, 3D LCD display, twin-lens projector), appreciation environment information (e.g., supposed appreciation distance, screen size, appreciation range angle), gaze point information indicating the coordinates of the gaze point, image quality correction information, and the other history information. The detailed information is not described directly in text, but may be alternatively the identification information.

Figure 5:
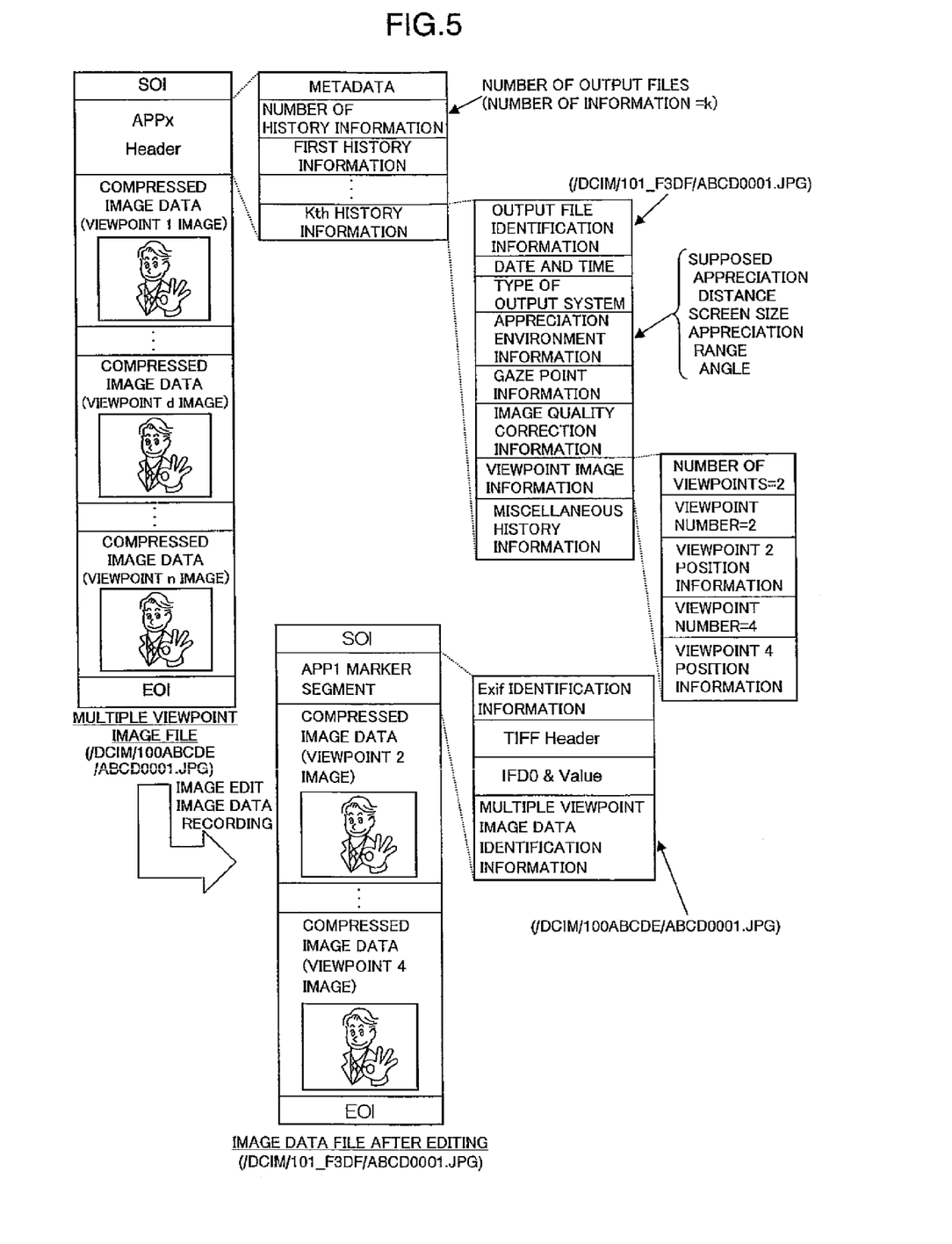
FIG. 5 is a diagram showing one example of the edit history information (such as viewpoint image information) stored in the header part of the mater file.

Also, the number of viewpoint images, viewpoint number ("viewpoint 2" and "viewpoint 4") and positional information of the viewpoint corresponding to each viewpoint number, actually selected and used from the multiple viewpoint image of the edit processing source, are described as the detailed information of the header part of the master file in FIG. 5.

Figure 6:
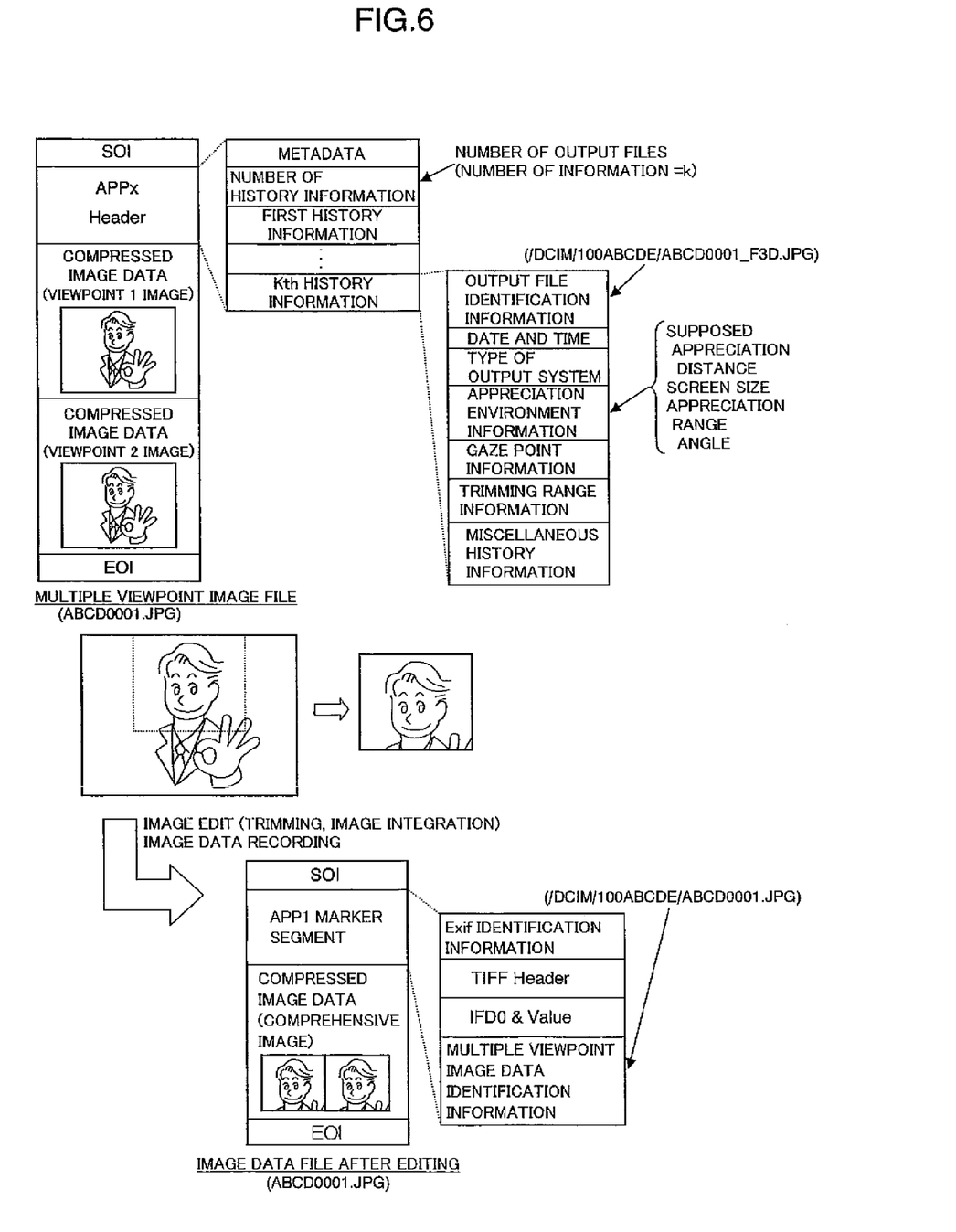
FIG. 6 is a diagram showing one example of the edit history information (such as trimming range information) stored in the header part of the mater file.

Also, the position in the trimming range of the viewpoint image of the edit processing source as the trimming range information is described as the detailed information of the header part of the master file in FIG. 6.

Figure 7:
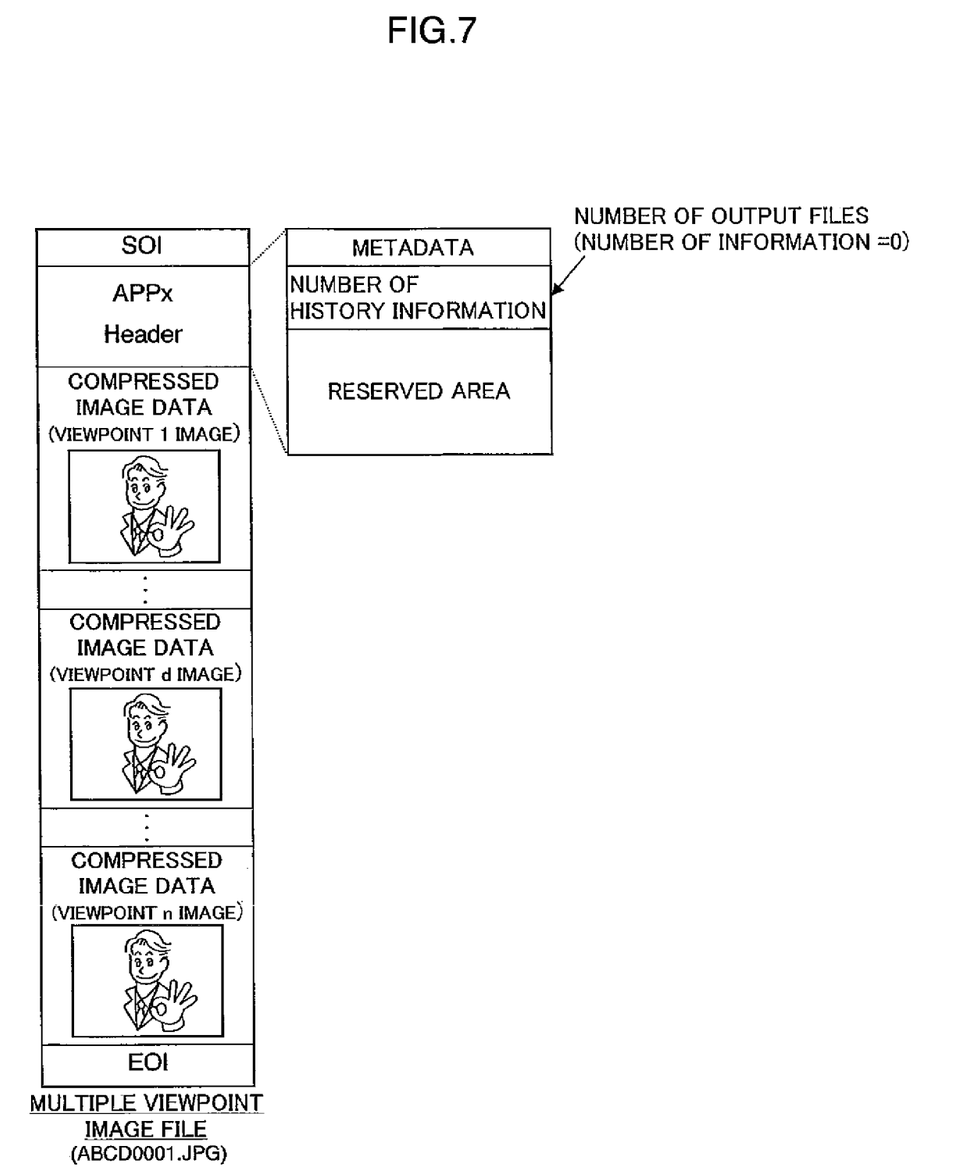
FIG. 7 is a diagram showing a reserved storage area of the edit history information provided in the header part of the mater file.

Also, it is indicated that a reserved area for storing the edit history information is reserved in the header part of the master file in FIG. 7. If the edit history information and the detailed information as shown in FIGS. 4 to 6 are stored in this reserved area, it is known what edit is performed so far by referring to the header part of the master file itself.

The file name "ABCD0001.JPG" of the master file may be stored in the header part of the edited file to trace the master file from the edited file, as shown in FIGS. 4 to 7.

Figure 8:
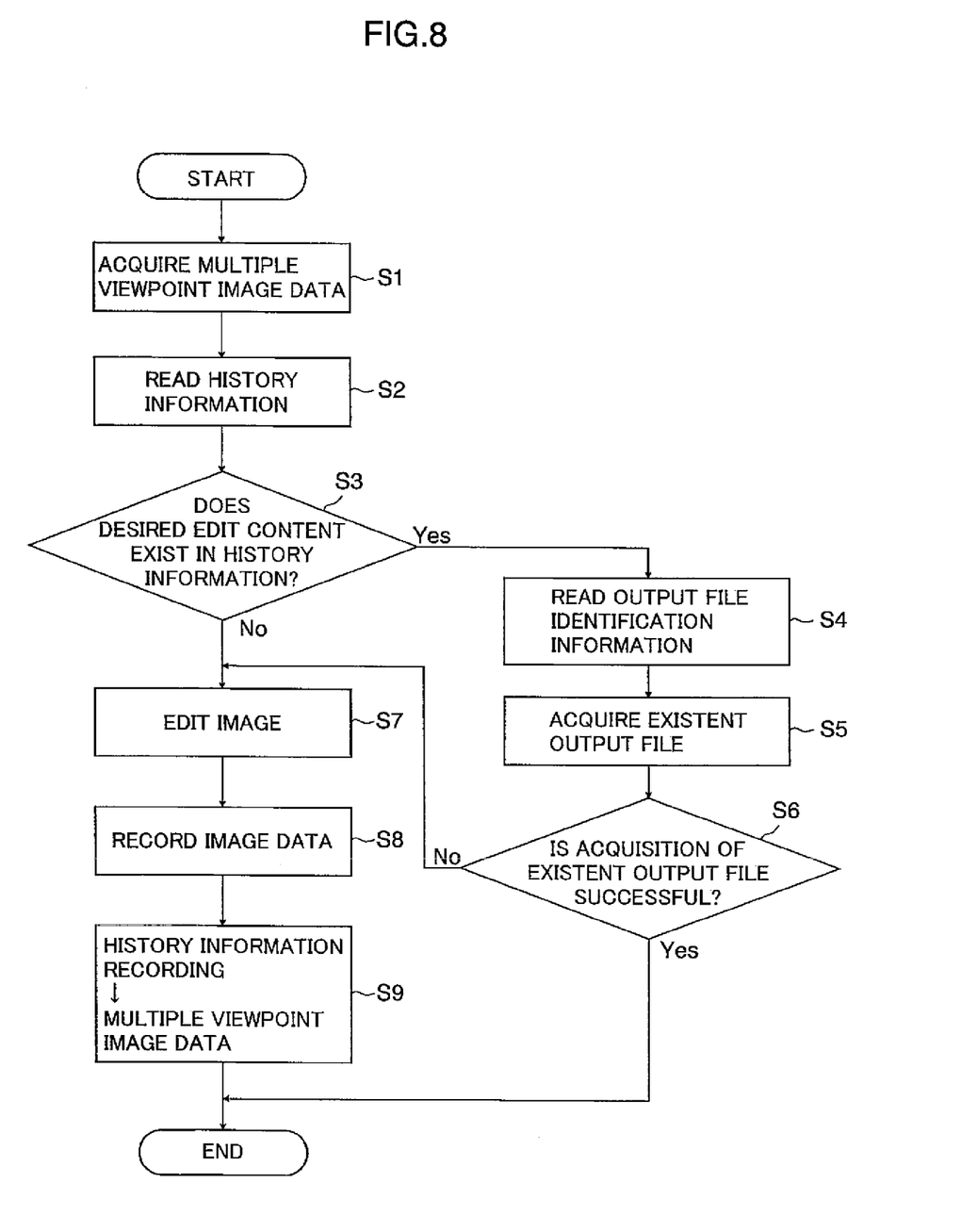
FIG. 8 is a flowchart of a multiple viewpoint image edit process.

FIG. 8 shows the flow of a multiple viewpoint image edit process on the personal computer 100. Each step of this process is defined by a multiple viewpoint image edit program stored in the hard disk unit 108. This process may be performed by any other apparatus, for example, the camera 1, than the personal computer 100.

At S1, a master file storing the unedited multiple viewpoint image data is acquired from the memory card 38 connected to the card I/F 112 or the camera 1 connected to the camera connection I/F 134. The master file is stored in the hard disk unit 108.

At S2, the CPU 102 reads the edit history information from each master file stored in the hard disk unit 108.

At S3, the CPU 102 accepts a designation of the desired edit content from the keyboard 120 or the mouse 122. And it is judged whether or not the master file storing the accepted desired edit content as the edit history information exists in the hard disk unit 108. If the master file storing the desired edit content as the edit history information is found, the operation goes to S4. If there is no such master file, the operation proceeds to S7.

At S4, the CPU 102 reads the identification information (e.g., file name "F3D_0001.JPG") of the edited file from the edit history information described in the header of the master file.

At S5, the edited file having the identification information is acquired by searching the hard disk unit 108 based on the read identification information of the edited file.

At S6, it is judged whether or not the acquisition of the edited file having the identification information is successful. If it is successful, a message indicating that the acquired file stores the multiple viewpoint image to which the designated edit content is reflected is displayed together with the image on the monitor unit 118, whereby this process is ended. If the acquisition of the edited file is not successful, the operation goes to S7.

At S7, the multiple viewpoint image data is edited in accordance with the designated edit content.

At S8, the multiple viewpoint image data after edit is stored as the edited file in the hard disk unit 108.

At S9, the edit history information to which the designated edit content is reflected is stored in the header part of the master file. And the master file storing the edit history information is stored again in the hard disk unit 108. The specific substance of this edit history information is shown in FIGS. 4 to 6.

In this process, since the multiple viewpoint image data for which the desired edit content is performed is acquired from the hard disk unit 108, it is unnecessary to take a trouble of making the same edit for the same multiple viewpoint image data as before, whereby the edited file corresponding to the desired edit content can be directly appropriated.

What is claimed is:

1. An image processing apparatus, comprising:
    a master image acquisition part for acquiring a master image that is the multiple viewpoint image data taken from two or more viewpoints;
    a recording part capable of recording the image data;
    a recording control part for recording the master image acquired by the master image acquisition part in the recording part; and
    an edit part for editing the master image recorded in the recording part according to a desired edit content;
    wherein the recording control part records an edited image that is the image edited by the edit part distinguishably from the master image in the recording part, and records the edit history information indicating the edit content made by the edit part associated with the master image in the recording part.

2. The image processing apparatus according to claim 1, wherein the edit history information includes at least one of the identification information of the edited image, the edit date and time of the edited image, the type of an output system of the edited image, the appreciation environment of the output system of the edited image and the other output conditions, a trimming range where the edited content is trimming, positional information of a set gaze point where the edit content is setting of the gaze point, information indicating a selected viewpoint image where the edit content is selection of the viewpoint image, and correction information where the edit content is image quality correction.

3. The image processing apparatus according to claim 1, wherein the recording control part records the edited image associated with the identification information of the master image in the recording part.

4. The image processing apparatus according to claim 1, wherein the recording control part reserves an area for storing the edit history information in an image file for storing the master image, and after the end of editing by the edit part, stores the edit history information in the area to associate the master image with the edit history information.

5. An image processing apparatus, comprising:
a recording part for recording an edited image in which a master image is edited distinguishably from the master image and recording the edit history information indicating the edit content of the master image and the identification information of the edited image associated with the master image;
a retrieval part for retrieving the edit history information corresponding to a desired edit content for the master image from the recording part; and
an edited image acquisition part for acquiring the edited image from the recording part based on the identification information of the edited image included in the found edit history information, if the retrieval part finds the edit history information indicating the desired edit content.

6. The image processing apparatus according to claim 5, further comprising:
an edit part for editing the master image recorded in the recording part in accordance with the desired edit content, if the retrieval part does not find the edit history information corresponding to the desired edit content, and
a recording control part for recording the edited image that is the image edited by the edit part distinguishably from the master image in the recording part and recording the edit history information indicating the edit content made by the edit part associated with the master image in the recording part.

7. An image processing apparatus, comprising:
a master image acquisition part for acquiring a master image that is the multiple viewpoint image data taken from two or more viewpoints;
a recording part capable of recording the image data;
a recording control part for recording the master image acquired by the master image acquisition part in the recording part; and
an edit part for editing the master image recorded in the recording part according to a desired edit content;
wherein the recording control part records an edited image that is the image edited by the edit part distinguishably from the master image in the recording part, and records the edit history information indicating the edit content made by the edit part and the identification information of the edited image associated with the master image in the recording part, and comprises a retrieval part for retrieving the edit history information corresponding to the desired edit content for the master image from the recording part, and an edited image acquisition part for acquiring the edited image from the recording part based on the identification information of the edited image included in the found edit history information, if the retrieval part finds the edit history information indicating the desired edit content.

8. An image processing method, comprising the steps of:
a step of acquiring a master image that is the multiple viewpoint image data taken from two or more viewpoints;
a step of recording the acquired master image in a recording medium;
a step of editing the master image recorded in the recording medium according to a desired edit content; and
a step of recording an edited image distinguishably from the master image in the recording medium, and recording the edit history information indicating the edit content associated with the master image in the recording medium.

9. An image processing method, comprising the steps of:
a step of recording an edited image in which a master image is edited distinguishably from the master image in a recording medium, and recording the edit history information indicating the edit content of the master image and the identification information of the edited image associated with the master image in the recording medium;
a step of retrieving the edit history information corresponding to a desired edit content for the master image from the recording medium; and
a step of acquiring the edited image from the recording medium based on the identification information of the edited image included in the found edit history information, if the edit history information indicating the desired edit content is found.

10. A non-transitory computer readable storage medium tangibly embodying a program of machine-readable instructions executable by a digital processing apparatus to perform the image edit method according to claim 8.

11. A non-transitory computer readable storage medium tangibly embodying a program of machine-readable instructions executable by a digital processing apparatus to perform the image edit method according to claim 9.

* * * * *